US006467001B1

(12) United States Patent
Gray et al.

(10) Patent No.: US 6,467,001 B1
(45) Date of Patent: Oct. 15, 2002

(54) VLSI CHIP MACRO INTERFACE

(75) Inventors: Mandy Alexander Gray, Southampton;
Michael J. Palmer, North Baddesley;
Ian David Judd, Otterbourne, all of
(GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/374,222

(22) Filed: Aug. 13, 1999

(30) Foreign Application Priority Data

Nov. 6, 1998 (GB) ............................................... 9824228

(51) Int. Cl.⁷ ........................ G06F 13/36; G06F 13/362
(52) U.S. Cl. ........................ 710/113; 710/117; 710/305
(58) Field of Search ................... 710/107–117, 305–317

(56) References Cited

U.S. PATENT DOCUMENTS 5,619,661 A    4/1997   Crews et al.

FOREIGN PATENT DOCUMENTS

GB       2 263 047 A    7/1993    ............ G06F/13/16
GB       2 326 065 A    12/1998   ............ G06F/13/42

OTHER PUBLICATIONS

IBM Technical Disclosure Bulletin, vol. 38, No. 6, Jun. 1995, pp. 375–378.*

* cited by examiner

*Primary Examiner*—Rupal Dharia
(74) *Attorney, Agent, or Firm*—Derek S. Jennings (57) ABSTRACT

The present invention provides a method and a system for connecting together, in a VLSI chip, a plurality of macros which require data flow connections between each other. A simple standard interface is realised between all macros. Any number of macros can be connected together, also allowing concurrent transactions between 4 or more macros using a cross-bar switch. Each macro may be a master (capable of requesting connections), a slave (capable of receiving connections from a master) or both. The centralised inter-connect logic includes three major components: the cross-bar switch, which makes the connections between the macros, the address decoder, which determines which slave each master wishes to connect to and an arbiter, which arbitrates between the macros when two or more masters request a connection simultaneously.

10 Claims, 5 Drawing Sheets

VLSI CHIP MACRO INTERFACE

TECHNICAL FIELD

The present invention relates to Very Large Scale Integrated (VLSI) circuit devices and particularly to a method and system for interconnection of macros in VLSI chips.

BACKGROUND ART

VLSI semiconductor circuit devices typically define complex systems including an extremely great number of circuits and multiple functional macros. The term circuit designates an entity consisting of one or two cells or areas of silicon containing circuit components. Due to the complexity and the great number of circuit components that must be contained on a semiconductor substrate in a VLSI device (chip), the design of such devices is a complex, expensive and time consuming activity. The component locations and the metallization connections for each unit must be individually designed to obtain maximum utility of the area of the semiconductor substrate for the circuits implemented on a particular substrate.

In chip design it is increasingly common to use predesigned functional macros and to combine them together in the development of new chips. The term macro designates an entity consisting of many cells arranged for a particular function, such as a CPU core or a memory controller. In the design of a new chip, one or more macros may be used. These macros may have been previously designed and tested and may even have been used in existing chips.

Figure 1:
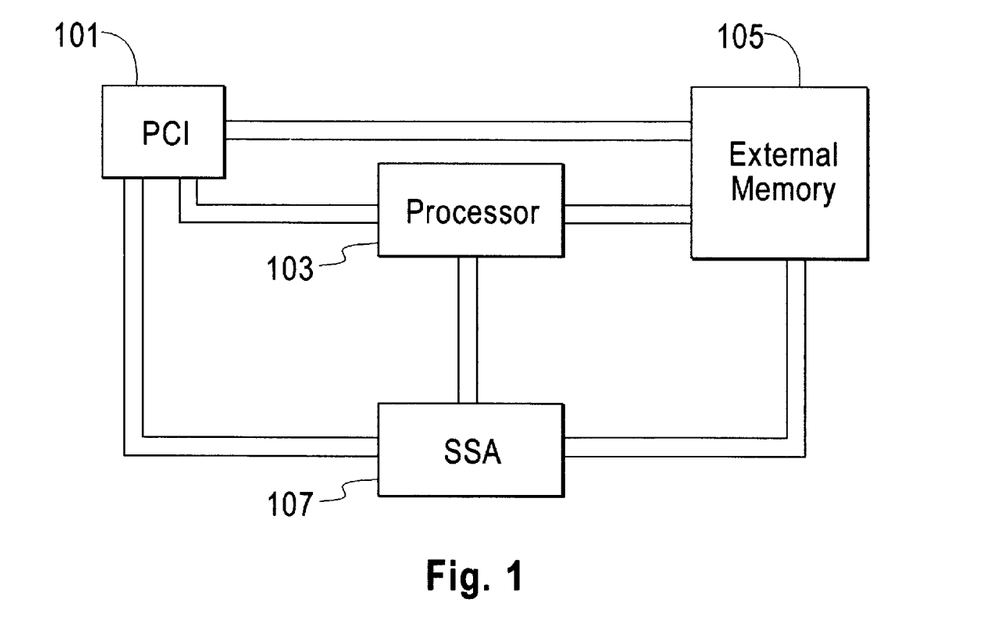
FIG. 1 shows schematically a prior art chip macros connection.

However the interface between these macros can be as complex as the designs themselves, and the benefit of using the macros can be eroded by the amount of time and effort taken to understand the interface, particularly when the designer of the new chip is different from the designer of the macros used, or when macros from several previous different projects are connected together. FIG. 1 shows an example of four macros connected together according to the state of the art method. Each macro may need to be connected to each other; when the number of macros increases or when the interfaces between the macros are complex, the connection may become a "spaghetti junction" of wiring, making integration, timing and simulation of a chip very difficult and not completely reliable. Furthermore, priority problems may arise when two or more macros try to establish a connection with the same other macro. A more structured design is desirable, which provides higher performances and allows new macros to be designed and tested concurrently.

The present invention has the object to overcome the above drawbacks.

SUMMARY OF THE INVENTION

According to the invention we provide a method for interconnecting a plurality of macros in a VLSI chip, each macro representing at least one function of the chip, each macro having input/output signals according to a predetermined interface, the plurality of macros including at least one master and at least one slave, the at least one master being capable to request connection to the at least one slave, the method comprising the step of:

connecting the plurality of macros to an interconnect macro, the interconnect macro having input/output signal according to said predetermined interface, the interconnect macro connecting the at least one master to the at least one slave, allowing concurrent slave are connected to the interconnect macro.

Furthermore, according to the present invention we provide, in VLSI chip comprising a plurality of macros, each macro representing at least one function of the chip, each macro having input/output signals according to a predetermined interface, the plurality of macros including at least one master and at least one slave, the at least one master being able of requesting a connection to the at least one slave, an interconnect macro having input/output signals according the predetermined interface, the interconnect macro comprising:

means for connecting to the plurality of macros;

means responsive to a request from the at least one master, for establishing a connection between the at least one master and at least one slave, allowing concurrent communications when more than one master and more than one slave are connected to the interconnect macro.

BRIEF DESCRIPTION OF THE DRAWINGS

Various embodiments of the invention will now be described in detail by way of examples, with reference to accompanying figures, where.

DETAILED DESCRIPTION OF THE PREFERRED EMBODIMENT

Figure 2:
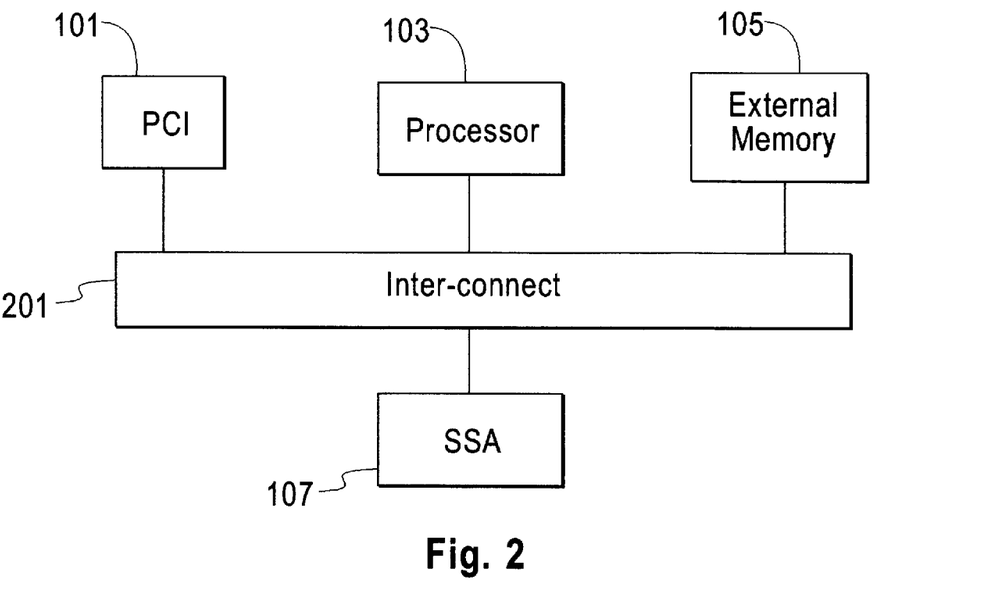
FIG. 2 shows schematically a centralised interconnect interface according to a preferred embodiment of the present invention.

With reference to FIG. 2 an embodiment of the present invention is described. A simple standard interface between the macros used for a chip is realised. According to a preferred embodiment a macro inter-connect 201 provides the interconnection between the macros 101, 103, 105 and 107. In the example of FIG. 2 the connected macros include an interface to PCI-bus 101, a micro-processor 103, an interface to external memory (e.g. SDRAM or EPROM) 105 and an SSA interface 107 to which disk drives may be attached. However, any number of macros can be connected together, also allowing concurrent transactions between 4 or more macros using a cross-bar switch. Each macro may be a master (capable of requesting connections), a slave (capable of receiving connections from a master) or both.

The centralised inter-connect logic 201 includes three major components: the cross-bar switch, which makes the connections between the macros, the address decoder, which determines which slave each master wishes to connect to and an arbiter, which arbitrates between the macros when two or more masters request a connection simultaneously to the same slave. Another possible conflict is when two macros request, as masters, simultaneously connection to each other, as slaves.

Figure 3:
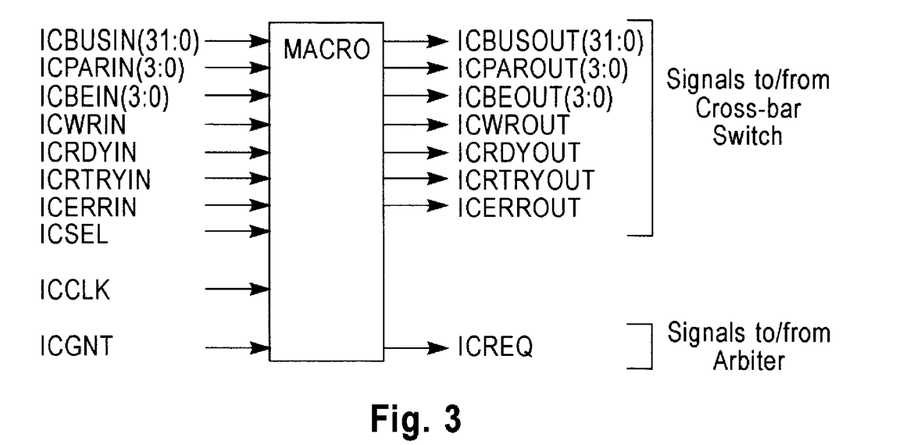
FIG. 3 is a diagram of the signals required for each macro to attach to the interconnect interface according to a preferred embodiment of the present invention.

The example of FIG. 3 shows a block diagram of the signals required for each macro to attach to the inter-connect controller 201 according to a preferred embodiment of the present invention. The protocol used in the preferred embodiment described herein is loosely based on the protocol used by the PCI (Peripheral Component Interconnect) standard. This standard is publicly available and is in wide use throughout the computing industry. The main features of the PCI protocol which have been incorporated into the interconnect of the preferred embodiment of the present invention are:

Aborts;
Retries;
Burst Transfers;
Master and Slave Pacing.

I/O Signals

The signal names are generic for the inter-connect macro. In a preferred embodiment for chips containing multiple macros, each signal name will be prefixed or suffixed with a number or characters to identify the macro which sources or sinks the signal. For the examples given here, mnemonic signal names such as ICSEL1, ICBUSOUT3 have been used. Table 1 gives a description of the signals represented in FIG. 3. The column headed M/S/B identifies whether each signal is required by the macro when it is in master mode (M), when it is in slave mode (S), or in both (B); if a macro needs to act only as a master or a slave but not both, then only a subset of the signals is required for that particular macro.

| Symbol | # | Type | M/S/B | Description |
|---|---|---|---|---|
| ICBUSIN(31:0) | 32 | I | B | Inbound Address/Data Bus. Multiplexed address/data bus into the macro, coming from another macro through the macro inter-connect. Bit 0 is the LSB. |
| ICPARIN(3:0) | 4 | I | B | Inbound Address/Data Parity. There is one parity bit per byte for the address/data bus. Parity is carried through the data flow by the macro interconnect but is not generated or checked. It is the responsibility of each indlvidual macro to generate and check parity as required. ICPARIN(0) covers ICBUSIN(7:0). The parity is valid at the same time as the data which it covers for each valid data byte. It is also valid when ICBUSIN contains a valid IC address. |
| ICBEIN(3:0) | 4 | I | S | Inbound Byte Enables. The byte enables are driven by the master macro and are inbound to the slave. They can be used in any combination, and may be different for each word of data transferred. ICBEIN(0) covers bits ICBUSIN(7:0) or ICBUSOUT(7:0) depending on the direction of the transfer. ICBEIN for the first word are valid at the same time as the address on ICBUSOUT(31:0). ICBEIN for each following word are valid at the time that the preceding data transfer takes place. Thus ICBEIN is always one word ahead of the corresponding data, for both reads and writes. ICBE may not be valid while ICRDY (from master to slave) is inactive. |
| ICBUSOUT(31:0) | 32 | O | B | Outbound Address/Data Bus. Similar to ICBUSIN(31:0) except that this is the multiplexed address/data bus outbound from the macro. |
| ICPAROUT(3:0) | 4 | O | M | Outbound Address/Data Parity. Similar to ICPARIN(3:0) except this is the parity for the outbound address/data bus. Note that this must provide valid parity on all data transfers for each valid data byte being transferred on ICBUSOUT. It must also provide valid parity for all four bytes on ICBUSOUT when it contains a valid IC address. |
| ICBEOUT(3:0) | 4 | O | M | Outbound Byte Enables. Similar to |

-continued

| Symbol | # | Type | M/S/B | Description |
|---|---|---|---|---|
| | | | | ICBEIN(3:0) except these are the byte enables outbound from the master macro. |
| ICWRIN | 1 | I | S | Write In. Write signal to the slave macro which indicates the direction of the data transaction. It is driven by the master macro and must not change throughout the data transaction. It is low for a read, and high for a write. |
| ICWROUT | 1 | O | M | Write Out. Write signal from the master macro which signifies the direction of the data transaction. It must not change from the assertion of ICREQ throughout the data transaction. It is low for a read, and high for a write. |
| ICRDYIN | 1 | I | B | Ready In. Ready signal to the macro. This is an input to the macro which is activated when the other macro is ready to transfer data as either a master or a slave. |
| TCRDYOUT | 1 | O | B | Ready Out. Ready signal from macro. This output is activated by the macro when it is ready to transfer data as either a master or a slave. |
| ICERRIN | 1 | I | M | Error In. Error signal into the master macro. It is activated either by the arbiter when an invalid address is received, or by the slave macro when it detects a parity error on the address/data bus or any other error internal to the slave macro which should be passed to the master. |
| ICERROUT | 1 | O | S | Error Out. Error signal out from the slave macro. It is activated when the slave detects a parity error on the address/data bus, or any other error internal to the slave macro which should be passed to the master. |
| ICRTRYIN | 1 | I | M | Retry In. Signals to the master at the start of a transaction that the slave it has attempted to connect to cannot handle any requests, and the master should try again later. It can also be signalled during a transaction when the slave can no longer continue (for example, when it has run out of data on a read, or out of space for data on a write) It is asserted in place of ICRDYIN and has the same timing that ICRDYIN would have had. |
| ICRTRYOUT | 1 | O | S | Retry Out. Activated by the slave macro at the start of a transaction to indicate to the master that it is unable to handle any requests, and the master should try again later. |
| ICSEL | 1 | I | S | Select. Select line to the macro. This signal is an input to the slave macro which comes from the arbiter. It is activated by the arbiter to select the macro as a slave and indicates that a connection has been made between this macro and the master macro. It goes inactive at the start of the last word of a burst, telling the slave that the burst is finishing. |
| ICREQ | 1 | O | M | Request. Request line from the master macro. This signal goes from the macro to the arbiter to request a connection. The macro will be acting as a master in this case. At this time there must be a valid |

| Symbol | # | Type | M/S/B | Description |
|---|---|---|---|---|
| | | | | address on ICBUSOUT(31:9). This signal is driven inactive by the master at the start of the last word of a burst, telling the arbiter that the burst is finishing. |
| ICGNT | 1 | I | M | Grant. Grant line to the master macro from the arbiter. This signal is activated by the arbiter to acknowledge ICREQ. This indicates that a connection has been established between the master and the selected slave. if the arbiter wishes to preempt the transaction it de-asserts ICGNT to the master (this can occur at any time during the transaction). The behaviour of the master in this case is chip-dependent. |

Retry

To avoid the possibility of deadlock, a retry signal has been included in the inter-connect definition. This is for use when a connection is made to a slave which is unable to process any requests. The slave will assert its ICRTRYOUT signal to the master which initiated the request. When this happens the master removes its ICREQ signal and will retry the operation at a later time, which is macro dependent. As far as the inter-connect arbiter is concerned, the operation has been completed and it has no knowledge that there was no data transferred.

Addressing Scheme

The addressing scheme for the macro inter-connect is chip dependent. The inter-connect incorporates an address decoding scheme associated with the cross-bar switch which will be different for each chip this is used in. Each slave is allocated a unique portion of the address space. When a master issues a request, the address determines which slave macro it wishes to connect to.

Cross-Bar Switch

Figure 4:
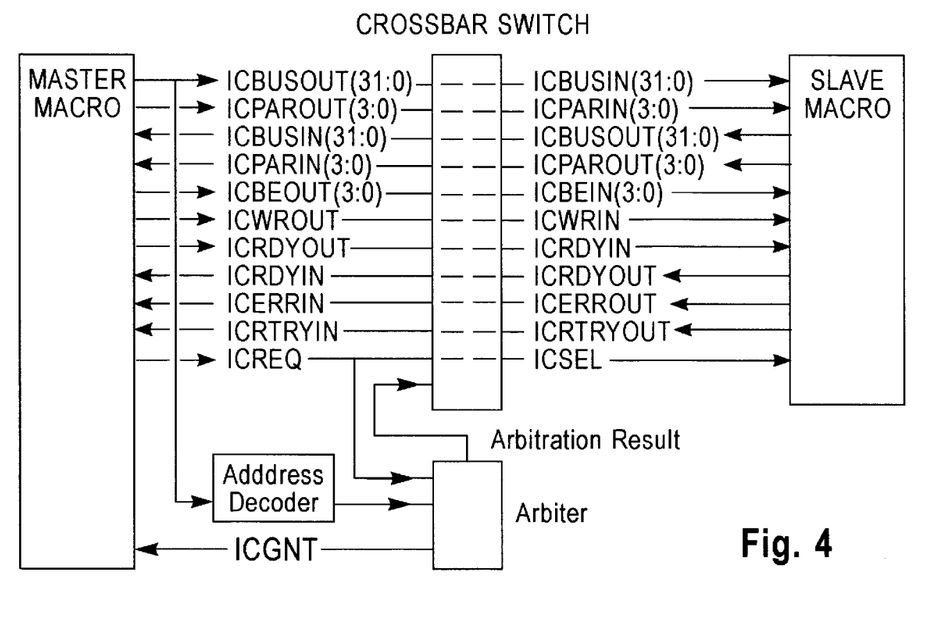
FIG. 4 is a diagram of the connection between a master macro and a slave macro through the cross-bar switch according to a preferred embodiment of the present invention.

The cross-bar switch is responsible for making the connection between the master and slave macros when the master has made a successful request for a connection. FIG. 4 shows a block diagram of the connections between a master and a slave macro made by the cross-bar switch according to a preferred embodiment of the present invention. The cross-bar switch is capable of supporting multiple transactions simultaneously. For example, when there are four macros connected together there can be two conversations taking place at the same time. Each macro can support only one transaction (either as a master or as a slave) at a time. In the special simple case of there being two macros present in a chip the inter-connect reduces to a mere point to point connection; in such case a simple arbitration may still be required for the case both macros initiate a request simultaneously.

In the cross-bar switch of the preferred embodiment of present invention, no tri-state signals are used. Past experiences in VLSI chip design showed that internal tri-state signals may cause problems, particularly during product test, which is a very important phase in chip manufacture. For example, with internal tri-state signals, it should be ensured that two drivers are not activated at the same time during test, otherwise damage may occur. This complicates automated test pattern generation and may result in a lower test coverage. Another possible problem with tri-state signals is the difficulty of detecting faults on the enable logic, since an undriven bus might accidentally be at the expected level and so pass the test.

Furthermore, a bus with several tri-state drivers has more capacitance than point-to-point wiring, which slows down signal propagation.

For the above reasons, the cross-bar switch according to a preferred embodiment of the present invention, is built from digital multiplexer circuits which have receive signals from all the macros and gate one of them through to the appropriate macro input port. A separate multiplexer for each macro input permits multiple connections to be active at the same time Arbiter The arbiter is chip dependent. However the basic features are common to all chips. In the preferred embodiment described herein, the arbiter has as input a request line (ICREQ) from each macro, and as output a grant line (ICGNT) to each macro and control lines to the cross-bar switch. A master macro initiates a request by asserting ICREQ. The arbiter responds to the ICREQ and if a connection is made, asserts ICGNT to the master macro. ICREQ passes through the cross-bar switch and appears as ICSEL to the slave to indicate that a connection has been successfully established.

Preemption is an option for both arbiter and masters and details of when it is used are chip dependent. If the arbiter wishes to preempt a transaction, it negates ICGNT to the master, this may occur at any time during the transaction. This signals to the master that it should consider terminating the transaction within a few data transfers.

In the preferred embodiment the priority for each macro is set by use of a multi-bit field in the ICPRIOR register which exists in the inter-connect logic. This has a priority field for each macro and this can be set to the desired value at any time. The number of bits in the priority field will depend on the number of masters present on the chip. For a chip containing four masters a two bit field would be required to give each master a unique priority. There may also be a requirement to have one additional value to allow the firmware to disable a master completely, for example by setting its priority field to all zeroes.

The priority for two or more masters may be set to the same value. In this case some arbitration is required if two master macros with the same priority request a connection to the same slave macro simultaneously. The arbitration method used is dependent on the implementation. Those skilled in the art will appreciate that a number of different arbitration methods may be used. A fairness algorithm may also be implemented into the arbiter.

Figure 5:
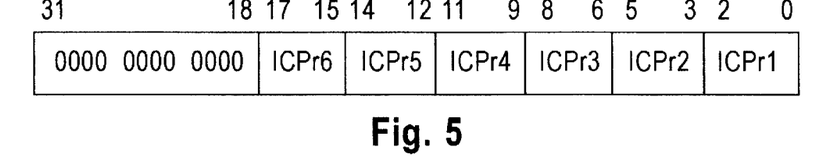
FIG. 5 shows an example of the interconnect priority register according to a preferred embodiment of the present invention.

According to a preferred embodiment, the ICPRIOR register is a 32-bit register, the format of which depends on the number of masters which are present in the chip. FIG. 5 shows an example of a priority register for a six master system. With six masters a three-bit priority field is required to give each master a different priority.

Bus Operation

The following example describes the operation of the bus, according to a preferred embodiment of the present invention, for a basic transaction, which does not require any arbitration:

1. The master initiates a transaction by activating its request line to the arbiter (ICREQ). Once this line has been activated it cannot be deactivated until either ICGNT has gone active, or the macro itself gets selected as a slave.
2. At the same time the master must have a valid address on its outbound address line (ICBUSOUT(31:0)). This is used by the address decoder to determine the macro being addressed. ICBUSOUT(1:0) are always 00b, during the address phase.
3. The master uses ICWROUT to indicate the direction of the requested transfer at this time.
4. There are no other connections taking place so a cycle later the arbiter grants the bus to the master (ICGNT).
5. At the same time the arbiter makes the connection to the requested slave macro by asserting its select signal (ICSEL).
6. The cross-bar switch multiplexes all the other signals to make the connection between the master and slave.
7. A cycle after ICGNT has been activated, the data transfer takes place. There is no minimum amount of data that needs to be transferred, and the maximum amount will be dependent on the master and slave macros, and the buffers being used.
8. Data is transferred on each clock cycle, with the address auto incrementing at each word transferred.
9. The transaction is paced by use of the ICRDY signals from the master and the slave.
10. The master de-asserts ICREQ at the start of the final data transfer, and this indicates the last of the operation. ICSEL is de-asserted to the slave, to tell it that this is the last transfer.
11. When the data transfer is complete the arbiter de-asserts its ICGNT line. The master may simultaneously request the bus again for another transaction.

The following should be noted:

The master can do only one transaction each time it is granted the bus (that is one address phase and one or more words of data).

Data is transferred only when both ICRDY lines (indicating master and slave are ready) are active.

An arbiter may optionally implement a time out. In this case, if there is no data transfer for 64 clocks (if either ICRDYOUT or ICRDYIN stays low for 64 clocks) then a timeout occurs, and the arbiter will then activate ICERRIN to the master macro.

If a slave macro has parity checking enabled and it sees a parity error on the address/data lines it will activate ICERROUT. This is connected by the cross-bar switch to the ICERRIN signal of the master macro.

The address phase lasts from the rise of ICREQ to the cycle after the rise of ICGNT, but may be interrupted by an incoming ICSEL.

The BEs may change for each word transferred, and are valid in any combination.

The transaction is complete when ICREQ, ICRDYOUT and ICRDYIN are all inactive.

The minimum transaction length is three clocks for a single word transfer. There are no recovery cycles.

Figure 6:
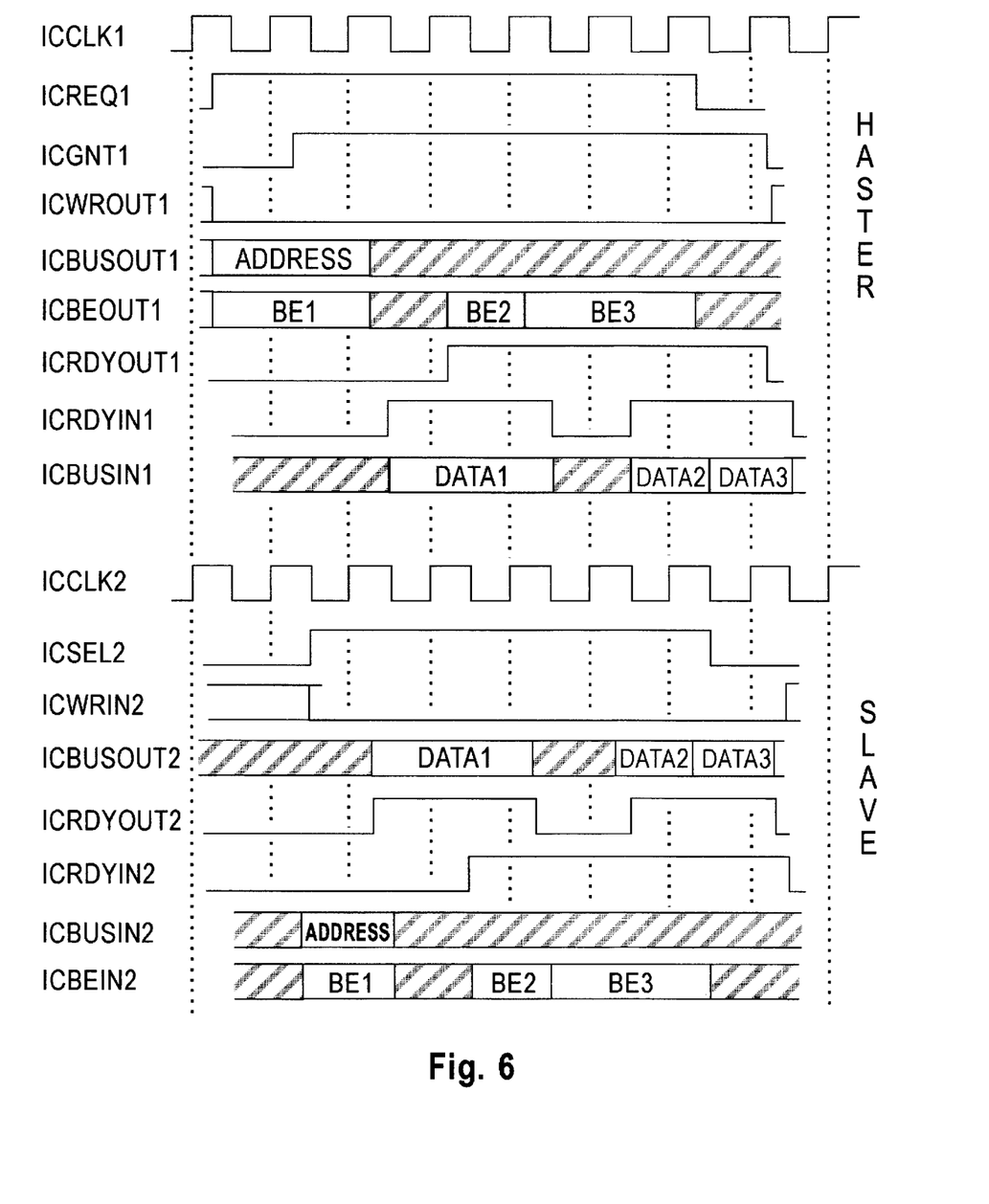
FIG. 6 is a timing diagram showing the waveform for a 3 word read according to a preferred embodiment of the present invention.
Figure 7:
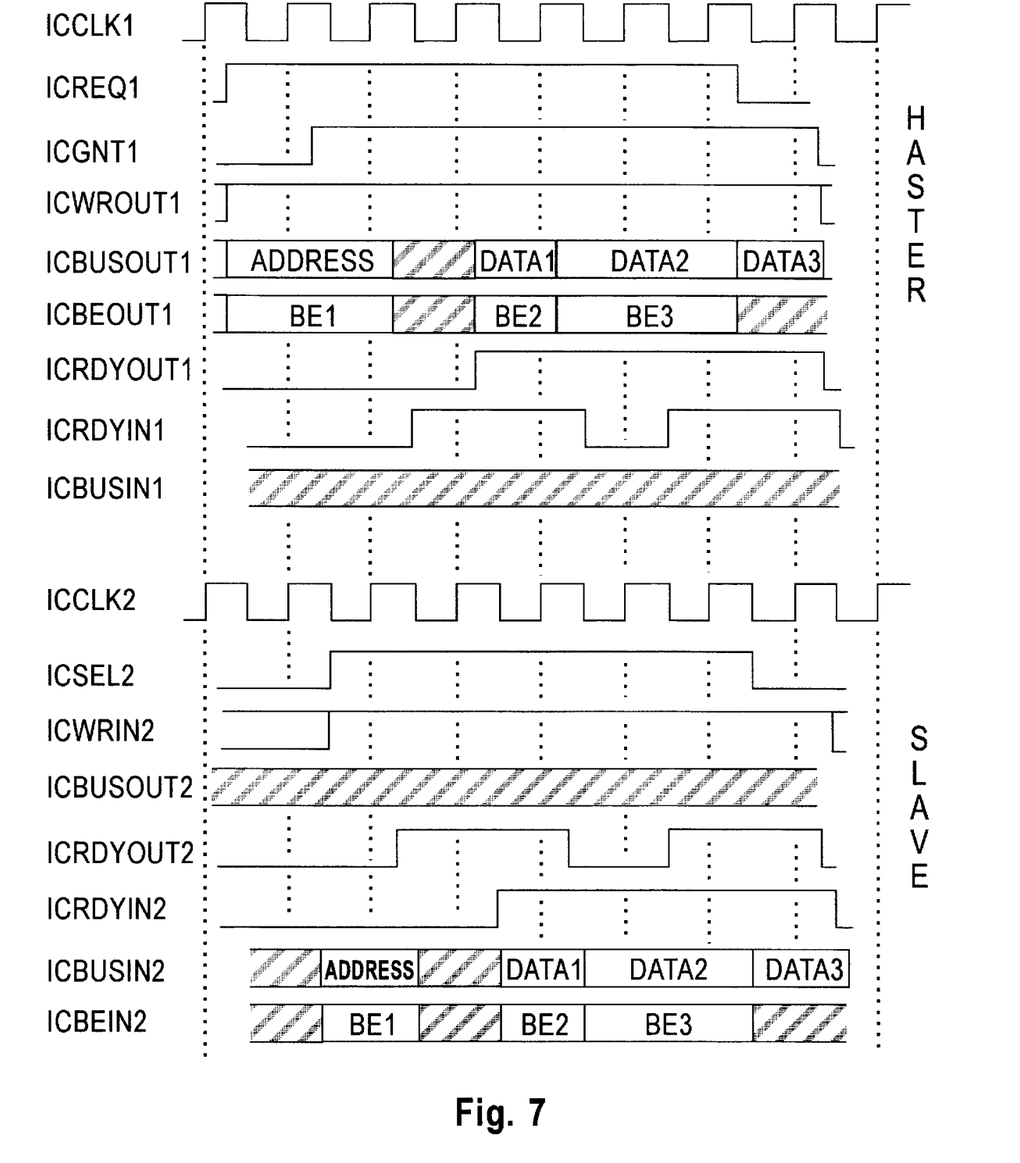
FIG. 7 is a timing diagram showing the waveform for a 3 word write according to a preferred embodiment of the present invention.
Figure 8:
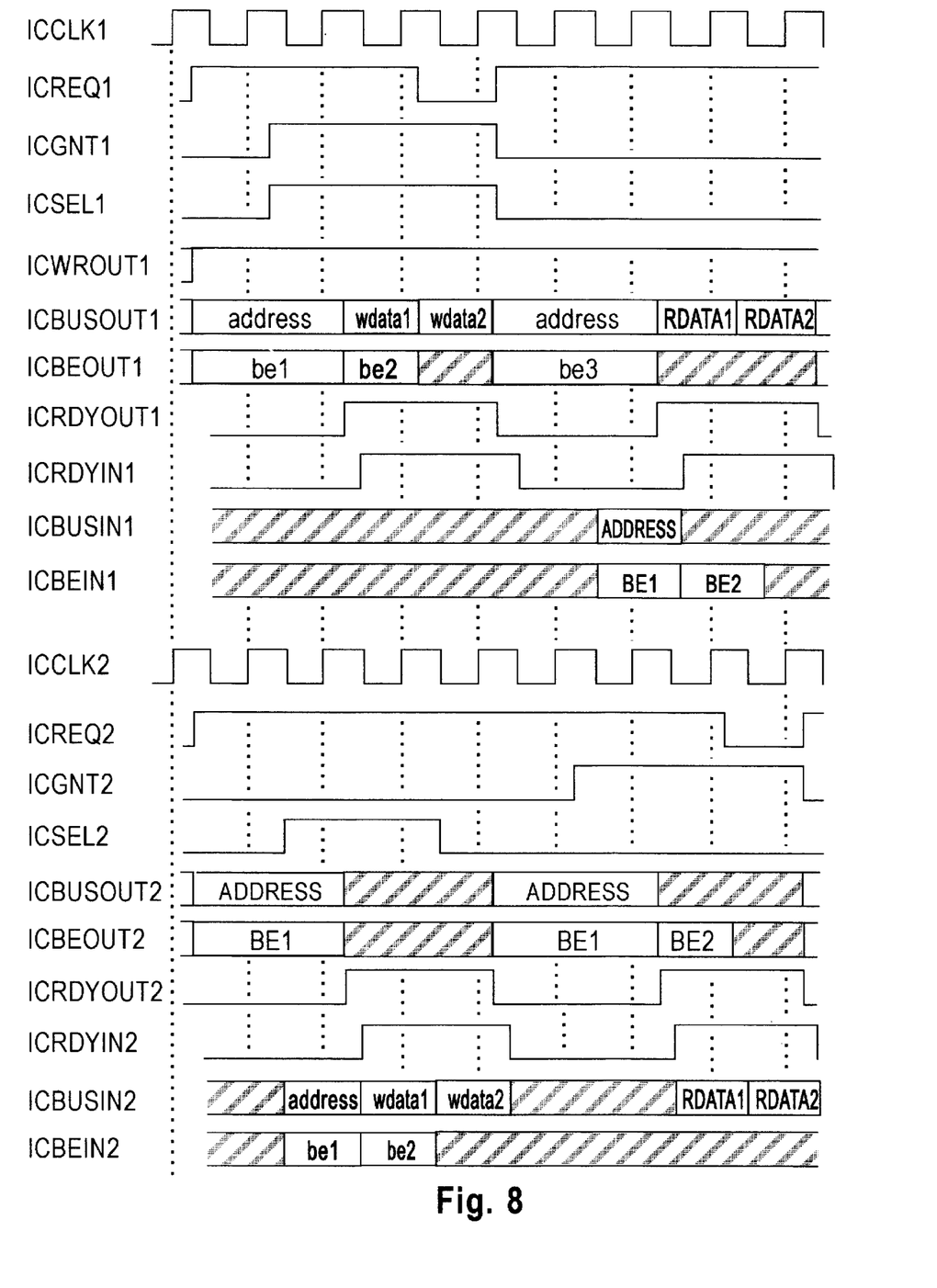
FIG. 8 is a timing diagram showing the waveform for interleaved transactions by two masters according to a preferred embodiment of the present invention.

FIG. 6, 7 and 8 show the sample waveforms of three typical transactions. FIG. 6 is a timing diagram showing the waveforms for a read of three words by macro1 (the master) from macro2 (the slave). The first word has a wait state due to the master, the second has one due to the slave, the third word has no wait states. FIG. 7 is a timing diagram of the waveforms for a write of three words by macro1(the master) to macro2 (the slave). Again the first word has a wait state due to the master, the second has a wait state due to the slave and the third has no wait states. The diagram of FIG. 8 shows how ownership switches between competing masters. Macro1 wishes to write to macro2, while macro2 wishes to read from macro1. Small letters are used to show bus values relating to the former, capitals for the latter. All bursts in this example are for two words and no wait states are present.

What is claimed is:

1. A method for interconnecting a plurality of macros in a VLSI chip, each macro representing at least one function of the chip, each macro having input/output signals according to a predetermined interface, the plurality of macros includes a plurality of masters and a plurality of slaves, the method comprising the step of:

connecting the plurality of macros to an interconnect macro, the interconnect macro having input/output signals according to said predetermined interface;

establishing multiple connections for concurrent transactions where each of the plurality of masters is connected to at least one of the plurality of slaves;

responding to simultaneous requests by at least a first and a second macro to connect as masters to a third macro; and deciding which master to connect to the requested slave.

2. The method of claim 1 wherein the responding step further includes the step of providing the capability to connect each of the plurality of macros to each other one of the plurality of macros.

3. The Method of claim 1 wherein the deciding step includes the step of arbitrating between the simultaneous requests, wherein the arbitrating is based on a fairness algorithm.

4. The Method of claim 1 wherein the deciding step includes the step of arbitrating between the simultaneous requests, wherein the arbitrating is based on predetermined priorities.

5. An interconnect macro for a VLSI chip comprising a plurality of macros, each macro representing at least one function of the chip, each macro having input/output signals according to a predetermined interface, the plurality of macros includes a plurality of masters and a plurality of slaves, at least one master being able of requesting a connection to at least one slave, an interconnect macro having input/output signals according to the predetermined interface, the interconnect macro comprising:

connection elements for establishing multiple connections for concurrent transactions where each of the plurality of masters is connected to at least one of the plurality of slaves;

responsive elements for responding to simultaneous requests by at least a first and a second macro to connect as masters to each other; and a decision element for deciding which master to connect to the requested slave.

6. The interconnect macro of claim 5 wherein the connection elements further includes the capability to connect each of the plurality of macros to each other one of the plurality of macros.

7. The interconnect macro of claim 5 wherein the decision is based on a fairness algorithm.

8. The interconnect macro of claim 5 wherein the decision is based on predetermined priorities.

9. A method for interconnecting a plurality of macros in a VLSI chip, each macro representing at least one function of the chip, each macro having input/output signals according to a predetermined interface, the plurality of macros includes a plurality of masters and a plurality of slaves, the method comprising the step of:

connecting the plurality of macros to an interconnect macro, the interconnect macro having input/output signals according to said predetermined interface;

establishing multiple connections for concurrent transactions where each of the plurality of masters is connected to at least one of the plurality of slaves;

responding to simultaneous requests by at least a first and a second macro to connect as masters to each other; and deciding which master to connect to the requested slave.

10. An interconnect macro for a VLSI chip comprising a plurality of macros, each macro representing at least one function of the chip, each macro having input/output signals according to a predetermined interface, the plurality of macros includes a plurality of masters and a plurality of slaves, at least one master being able of requesting a connection to at least one slave, an interconnect macro having input/output signals according to the predetermined interface, the interconnect macro comprising:

connection elements for establishing multiple connections for concurrent transactions where each of the plurality of masters is connected to at least one of the plurality of slaves;

responsive elements for responding to simultaneous requests by at least a first and a second macro to connect as masters to each other; and a decision element for deciding which master to connect to the requested slave.

* * * * *